Figure 1:
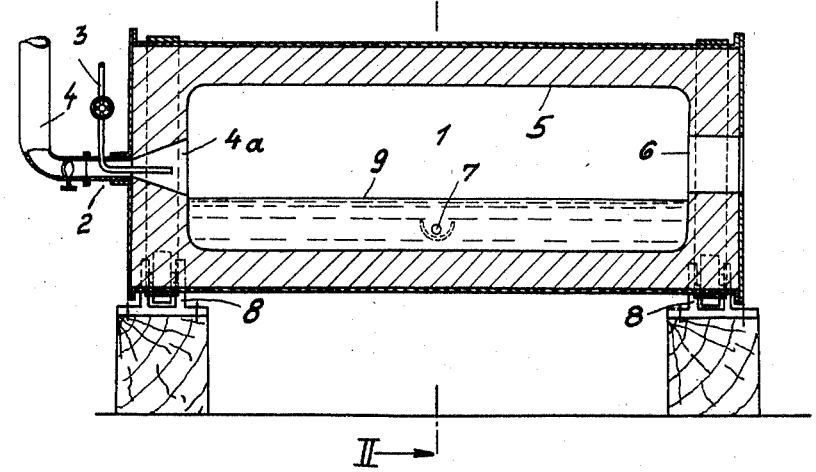

Oct. 22, 1929.    W. BUDDËUS    1,732,788
PROCESS OF REDUCING ORES AND THE LIKE

Filed Jan. 14, 1927

Inventor:
WILHELM BUDDËUS
BY
ATTORNEY

Patented Oct. 22, 1929

1,732,788

UNITED STATES PATENT OFFICE

WILHELM BUDDËUS, OF BERLIN-ADLERSHOF, GERMANY

PROCESS OF REDUCING ORES AND THE LIKE

Application filed January 14, 1927, Serial No. 161,127, and in Germany January 20, 1926.

This invention relates to a process of reducing ores, ore-like and metallurgical products of all kinds, which contain compounds, for instance, oxides, of easily fusible heavy metals, such as lead, tin, antimony and bismuth, by means of silicon or silicides.

Generally speaking, my invention consists essentially therein, that a charge of ore or the like is mixed with a proper quantity of silicon or silicides and brought into a liquid bath of slag which had been previously obtained from ore, for instance by means of a blast-furnace. The silico-thermic reaction now will produce a quantity of heat, which is sufficient to cause the scorification of the gangue and of the impurities in such a manner, that the temperature of the slag-bath will be maintained and the reduction and separation of the metals and the scarification of the gangue and of the impurities calmly performed.

Another novel feature of my invention consists in a modification of the afore-mentioned process, which is applicable, if the heat generated by the silico-thermic reaction should not be sufficient for causing the scorification of the gangue and of the impurities. In such event, according to my invention the charge is brought in highly heated condition into the slag-bath, so that the reaction takes place under production of heat.

A further novel feature of my invention consists therein, that the heat, which is contained in the ordinary blast-furnace slag, is utilized during discharging of the slag from the furnace for the purpose of separating the small quantities of valuable metals yet contained in said slag, by means of silicon or silicides.

My present invention utilizes the strongly exothermic reducing action exerted by silicon and silicides upon metal oxides exclusively for the purpose of reducing oxide-compounds of the metals lead, antimony, tin, and bismuth.

Heretofore it had been proposed, to separate difficultly fusible metals, such as chrome, titanium, molybdenum and the like from their oxides, by employing silicon as a reducing agent. This proposition, however, has not found any practical application, by reason of the fact, that owing to the high temperatures, which are required for this purpose, only compounds of silicon and the metals and no pure metal will be obtained.

For the production of the above-enumerated easily fusible heavy metals, viz. lead, antimony, tin and bismuth, silicon or silicides have so far not been employed. This may be due to the fact, that the oxides of these easily fusible heavy metals will produce with silicon calorific effects of such magnitude, that the metals thus formed evaporate at the reaction temperature, whereby the proper production of the metals will be rendered considerably more difficult.

In practice, however, pure or relatively pure oxides are scarcely used in a reducing process. More frequently the mass to be reduced consists of ores and metallurgical products, which contain in addition other metal oxides and gangue.

If such impure oxides of easily fusible heavy metals are mixed with silicon or silicides and heated to the reaction temperature, there will only be a partial reduction, the metals, however, which are formed thereby, will only be able to fuse together, if the exothermic effect of the reaction is sufficiently powerful in order to also melt the gangue and the impurities together with the metals. In this case, furthermore, the ores as well as the reducing agents would have to be very finely crushed in order to produce an intimate contact between the several parts. This, however, would involve such considerable expenses, that the practical application of this process is out of question.

Further difficulties are encountered, when heating the metal, which is subjected to the reaction, in finely crushed condition, to a reaction temperature of about 1000° C. In this case also, a partial evaporation of the formed metals cannot be avoided.

This difficulty of heating the mass, which is subjected to the reaction, to the proper reaction temperature and the further difficulty of preventing the metals from evaporating and the gangue from not fusing together with the metal, are fully avoided by my present invention. I accomplish this by causing the reaction between the silicon or the silicides and the oxide contents of the ore or metallurgical products to take place within a bath of liquid slag. The composition of such a slag-bath may be chosen in accordance with the metal oxide to be reduced, and more particularly in such a manner, that the impurities and the gangue will easily and quickly be scorified.

The slag-bath has for its purpose firstly, to quickly heat the charge, which is mixed with the same, by reason of the great quantity of heat contained in the slag-bath. The reaction in this case will take place automatically by reason of its exothermic character and at the same time maintain or increase the temperature of the slag-bath. A second purpose of the slag-bath consists therein, to prevent the evaporation of metal by taking up the surplus heat which is generated at the reaction temperature and to cause at the same time the scorification of the impurities and the gangue.

If ores or metallurgical products shall be reduced containing such small quantities of reduceable easily fusible heavy metals, such as lead, tin, antimony and bismuth, that the exothermic action of the reaction of the oxides of these metals with silicon or silicides in a bath of liquid slag is not sufficient for producing the scorification of the impurities of the respective ores or metallurgical products, the reaction mass or the respective ores or the like must be pre-heated separately from the slag-bath and supplied in heated condition to the latter. The degree of such pre-heating will then be dependent upon the quantities of metal contained in the ores and may be calculated in every case by the well known thermic data.

If, however, the above-mentioned easily fusible heavy metals are already contained in scorified condition in the slag, such as is the case with slags obtained from the usual metallurgical processes, it will be sufficient to add silicon or silicides to the liquid slag-bath in order to fully separate the slight quantities of valuable metals contained in the slag. Since in this case the oxides which are present as silicates are already heated to the temperature of reaction, the reaction between the oxides will at once take place, in spite of small quantities of oxides being contained in the slag-bath, under production of heat and increase of the temperature of the slag-bath.

In practice, therefore, the slag obtained from blast-furnaces, which yet contains slight quantities of valuable metals, may be deprived according to my present invention of its last contents of these metals. I accomplish this by supplying to the liquid slag, when discharging from the furnace, silicon or silicides in pre-determined quantities and at the same time using the motion of the flowing slag for bringing about an intimate mixing with the added silicon or silicides. The metals thus separated will deposit in the known manner in the fore-hearths of the furnace or in slag-pots and may easily be collected.

My present process of reducing ores of lead, antimony, tin and bismuth within a slag-bath by means of silicium or silicides and their exothermic reaction may be carried out in an apparatus of the well known kind.

In the accompanying drawing I have represented as an example a rotary furnace, by means of which the process according to my invention may be carried out.

Figure 2:
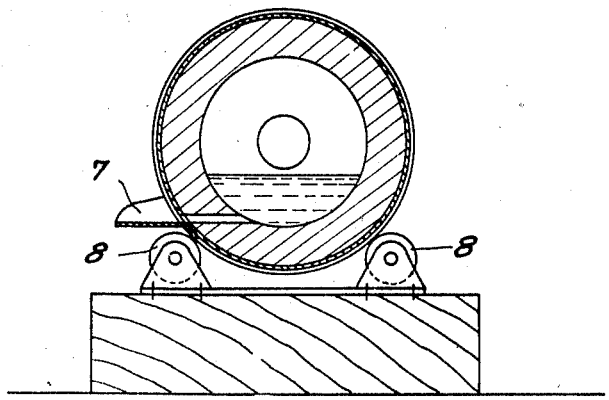

In the drawing, Fig. 1 is a longitudinal section through the rotary furnace which may be applied for my present process and Fig. 2 a transverse section taken along the line II—II of Fig. 1.

The rotary furnace 1 is operated in the well known manner by mounting the same upon rollers and rotating the latter by means of a motor or by hand. Mixing the slag with the charge may thus be accomplished by constant rotation of the furnace. The rotary furnace 1 is provided with a refractory lining 5. The burner 2 may be preferably an oil burner, which may be supplied through the oil-supply pipe 3, while air is introduced at the same time through the air-supply pipe 4. The air will thus finely atomize the oil and supply the same to the interior of the furnace through the nozzle $4^a$. The aperture for introducing the charge is shown at 6 and the aperture for letting-off the metal and slag is shown at 7. The means for rotatably supporting the furnace body are indicated by the rollers 8, 8, while the level of the slag-bath is indicated by the dotted line 9.

The apparatus represented in the accompanying drawing is an apparatus of well known construction, and I have solely added the drawing for the purpose of showing an apparatus by means of which my invention may be carried into effect.

The process according to my invention may of course be carried out by means of various other furnaces, such as for instance by means of a reverberatory furnace, in which first the slag serving for the slag-bath is molten and into which thereupon the reacting mass is added in certain intervals and worked up with the slag. After completion of the reaction, which takes place as a rule as early as after a few minutes, the produced surplus slag and the reduced metal may be let off, the latter preferably only after a sufficient quantity of the same has collected. Since the temperature of the slag will be increased by the exothermic reaction and this increase of temperature will be compensated by losses of heat due to radiation, in every individual case the reaction may be added at such intervals and in such quantities, that the temperature of the slag-bath will remain constant and the process be carried out continuously without any interruption.

A proper amount of certain constituents may be added to the charge, said constituents having the character of expediting the process of scorification in order to maintain the melting temperature of the slag-bath to some degree constant. Such constituents as known may consist of lime or silicic acid which are added according as to whether the charge is acidous or basic.

The reverberatory furnace may thereby be heated in the well known manner with coal, gas or oil. The form of the furnace shown in the accompanying drawing is especially well suited to bring about a proper mixing of the charge of the slag-bath by the rotation of the furnace.

If liquid slag is readily available in larger quantities, such as is the case in blast-furnace operation, the reaction between the ore and the silicium or the silicides may also be brought about by supplying the charge of silicium or silicides to the liquid slag, when the latter discharges from the furnace. More particularly, the quantity of this charge is so proportioned, that the temperature of the slag will be maintained and the reduced metal will be able to deposit in the fore-hearths of the furnace or in slag-pots before solidification of the slag takes place. By this process metallic dust and other ores and metallurgical products may be utilized, which are undesirable products in the blast-furnace practice.

The process according to my invention, however, may also be carried out in such a manner that the slag obtained from the blast-furnace will contain greater quantities of the respective metal than would be permissible in the ordinary blast-furnace operation. This may for instance be done as known by melting the ore in the blast-furnace upon a bath of metal. The operation of the furnace will in this manner become itself uneconomical, as the slag will contain a relatively large quantity of valuable metals. If the furnace, however, is operated in this manner and the slag obtained therefrom treated according to the process of my invention, the procedure as a whole which consists of the preliminary treatment of the ore in the blast-furnace and the subsequent treatment according to the process of my invention will be rendered highly economical. By so combining the uneconomical treatment of the ore in a blast-furnace and the subsequent treatment of the slag obtained from said furnace according to the process of my invention the valuable metals which after the furnace treatment are yet contained in the slag, may then be fully separated from the slag according to my present invention by means of silicon or silicides. By this latter modification of the process according to my invention a considerably greater charge may be worked in the blast-furnace and thereby the quantity of production considerably increased.

The following two examples are given in order to more fully explain my invention.

*First example.*—A liquid bath of hot lead-slag having a temperature of 1100° containing 1½% lead and having a weight of 10 tons is placed into a drum-furnace, converter and the like and 3 tons of a product containing lead-oxide, for instance litharge, having a contents of about 80% of lead are mixed with a quantity of ferro-silicon containing about 90% of silicon, said quantity corresponding to the entire contents of lead in the slag and the litharge. For instance for the quantity of 2550 kg. of lead 185 kg. of ferro-silicon are taken.

The mixture is supplied in crushed condition into the furnace and the latter is set in rotation. After the furnace has thus been charged, it is further rotated for about 10 minutes in order to complete the reaction, thereupon the furnace is left at rest also for about 10 minutes and the lead tapped off. The slag which remains in the furnace and which by exothermic reaction will be considerably heated, will then be ready for the reception of a new charge for such a time, until it will become too tough by reason of increased contents of silicic acid. The slag is now tapped off and substituted by a new charge of lead-slag.

As a rule a charge of lead-products up to 100% of the weight of a slag may be used. The thermic process is as follows:

2550 kg. of lead will give 268 thermal units per kg. of lead and, therefore, 683400 thermal units for 2550 kg. of lead, according to the equation of reaction:

$$2PbO + Si = 2Pb + SiO_2 + 111060 \text{ thermal units.}$$

In order to heat the charge of a weight of 3185 kg., there will be required for a specific heat of 0.08:

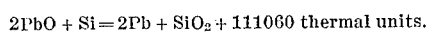

$$3185 . 1100 . 0.08 = 280280 \text{ thermal units.}$$

Deducting the latter amount of thermal units from the former amount, there will remain for the heating of the slag-bath 403120 thermal units, which will cause an increase of the temperature of the bath by approximately 100 degrees.

With each further charge of 30% the temperature of the bath may further be increased by 100 degrees so that the reaction temperature of the bath even in case of relatively large losses due to reaction will be maintained.

*Second example.*—A bath of lead-slag having a weight of 10 tons with 1½% lead is for instance mixed with 30% = 3 tons hot sintered material of a temperature of about 800 degrees with 30% lead and 20% iron in form of iron oxide together with the required quantity of ferro-silicon having 90% contents of silicon which is required for reducing the lead-oxide and the iron-oxide to protoxide. The thermal process will now be as follows:

1050 kg. of lead will produce 1050.268 = 281400 thermal units. The quantity of 600 kg. of iron under reduction of $Fe_2O_3$ to FeO will give 4.56.573 + 28.7595 and for 1 kg. iron 376 thermal units, in total 225600 thermal units, which added to the former 281400 thermal units will amount to 507000 thermal units.

The latter process is performed according to the equation:

$$2Fe_2O_3 + Si = 4FeO + SiO_2 + 84308 \text{ thermal units.}$$

In order to heat 3000 kg. of sintered material from 800° to 1100° there will be required:

3000.300.0.2 = 180000 thermal units.

To heat 168 kg. FeSi to a temperature of 1100° there are required 1100.168.0.2 = 36960 thermal units. The amount of 180000 thermal units as well as the amount of 36960 thermal units must be added up and, therefore, 216960 thermal units will be required for heating the sintering material as well as the ferro-silicon.

There will remain, therefore, for heating the bath having a weight of about 12 tons: 507000 − 216960 = 290640 thermal units, which cause the temperature of the bath to be raised by about 60 degrees. This increase of temperature will likewise be sufficient in order to compensate for the heat losses which are due to radiation.

In case of the formerly proposed reduction of the lead contained in lead-slag by means of iron or ferro-silicon there will be in case of iron an increase of the temperature by 0.69 degrees in case of 1½% contents of lead, while an increase of temperature by about 11–12 degrees will be obtained when employing ferro-silicon having a contents of 90% iron. This small increase of temperature will not be sufficient in order to fully separate the lead from the slag. A complete liberation of the lead from the slag will only be possible by producing heat by exothermic action by adding lead-ore, the lead which is separated from said ore causing the small quantities of lead contained in the slag to be also separated therefrom.

According to my invention now, for ores etc. having a content of oxide which is not sufficiently high in order to produce by reaction with silicon or silicides such a quantity of heat that also the gangue and the impurities will be caused to melt, the charge alone or also the ores or the like may be preheated outside of the slag-bath to such a temperature that the heat which is produced by the exothermic reaction will be sufficient to melt also the gangue and the impurities.

I claim:
1. The process of reducing ores, ore-like and metallurgical products containing compounds, for instance oxides, of easily fusible heavy metals, such as lead, tin, antimony and bismuth, said process consisting in bringing a charge of said ores or products mixed with the proper quantity of silicon or silicides into a liquid bath of slag which had previously been obtained by melting ore of the respective metal in a furnace, whereupon there will be produced by silico-thermic reaction a quantity of heat to cause the scorification of the gangue and impurities in such a manner, that the temperature of the slag-bath will be maintained and the reduction and separation of the metals as well as said scorification calmly performed.

2. A process according to claim 1, wherein, in case the silico-thermic reaction should not be sufficient to cause the scorification of the gangue and of the impurities, the charge is brought in such highly heated condition into the slag-bath, that the reaction takes place under production of heat.

3. A process according to claim 1, wherein the charge of ore and silicon or silicides is brought into the liquid slag obtained from a blast-furnace, said process consisting in bringing about a condition of temperature of said charge, whereby the heat contained in said slag will be sufficient to separate the metal and to cause the scorification of the gangue and of the impurities, before the slag solidifies.

In testimony whereof I have affixed my signature.

WILHELM BUDDĖUS.